Oct. 30, 1962 J. R. KOBBE 3,061,788

MULTIVIBRATOR HOLD-OFF CIRCUIT

Original Filed Feb. 21, 1955

INVENTOR.
JOHN R. KOBBE

BY
BUCKHORN, CHEATHAM & BLORE
ATTORNEYS

United States Patent Office 3,061,788
Patented Oct. 30, 1962

3,061,788

MULTIVIBRATOR HOLD-OFF CIRCUIT

John R. Kobbe, Beaverton, Oreg., assignor to Tektronix, Inc., Portland, Oreg., a corporation of Oregon Original application Feb. 21, 1955, Ser. No. 489,614, now Patent No. 2,853,609, dated Sept. 23, 1958. Divided and this application Sept. 17, 1958, Ser. No. 761,570
7 Claims. (Cl. 328—196)

Figures 1, 2:
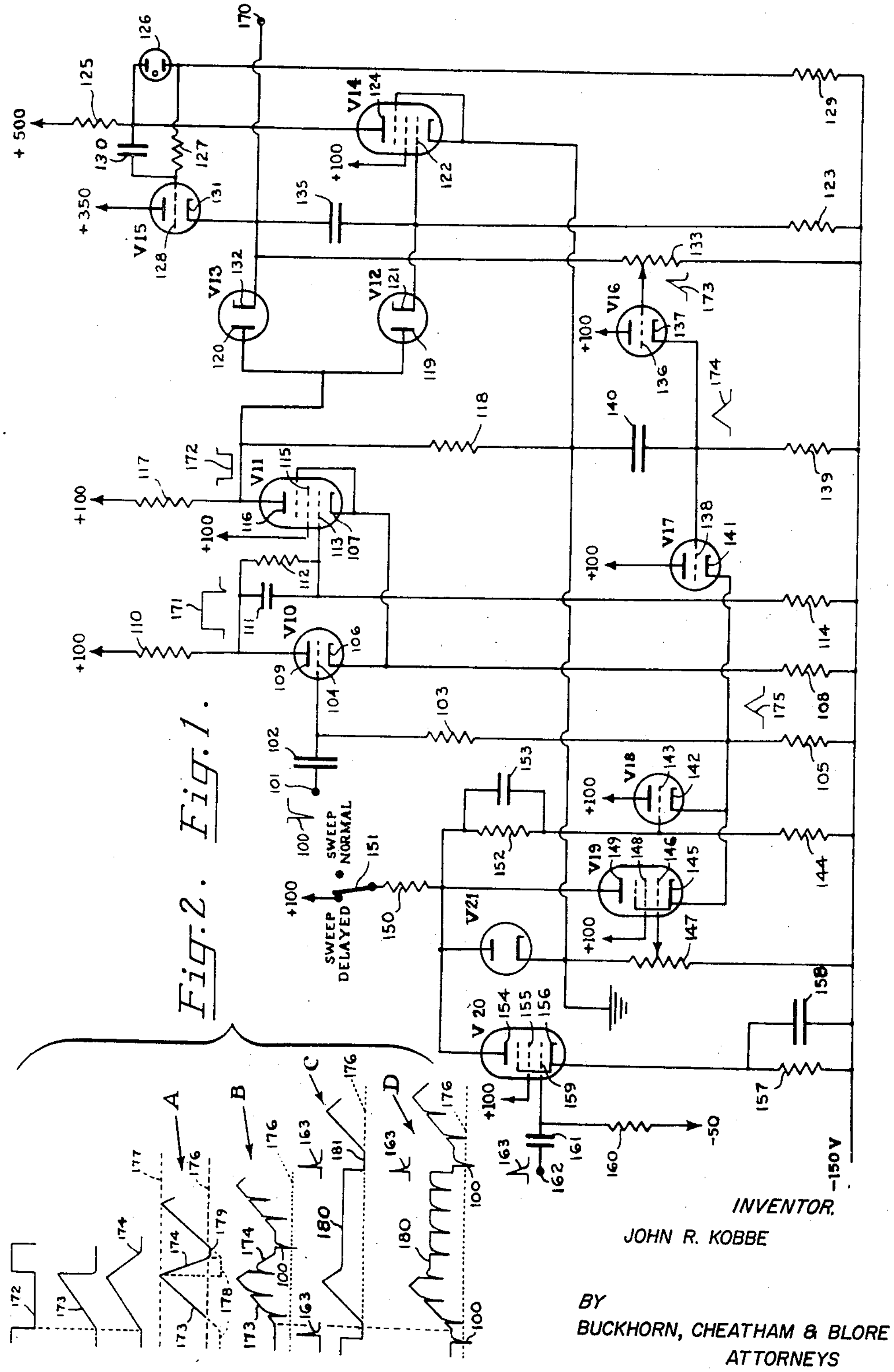

This invention relates to trigger circuits, and relates particularly to a novel method and circuit arrangement for use with a multivibrator to prevent actuation of the latter through premature triggering by random or other trigger signals during a desired cycle of multivibrator action.

The present application is a division of a copending application Serial No. 489,614, filed February 21, 1955, filed as a joint application of R. L. Ropiequet and the present applicant and now Patent No. 2,853,609 granted September 23, 1958, for Multivibrator Hold-Off Circuit.

In circuitry provided, for example, in cathode ray oscilloscopes for the generation of a sawtooth waveform time base, it is sometimes the practice to provide a multivibrator of the direct coupled type which has no timing circuit components, and therefore the recovery time of the multivibrator is necessarily quite short. Accordingly, in order to prevent faulty operation it is required that means be provided to prevent the multivibrator from being triggered before the sawtooth generator has returned to its quiescent state, i.e., before the sweep capacitor is completely discharged. Similarly, mono-stable multivibrators provide recovery times shorter than the recovery of the sawtooth generator, and therefore the same precaution must be taken.

One means for achieving this result is to utilize the recovery waveform of the multivibrator or the sawtooth waveform of a sweep generator to disconnect the multivibrator from the trigger source. However, each of these waveforms has a region of voltage and time change near the end of its recovery period in which the arrival of a trigger signal is capable of causing premature re-triggering of the multivibrator. Furthermore, this method does not control the operation of the multivibrator and therefore, although it may be effective in preventing premature triggering by external signals, it cannot prevent premature operation of the multivibrator when the latter is in a free-running condition.

Another means for achieving this result involves the circuitry of the multivibrator in arrangements which prevent the multivibrator from recovering until a definite time has elapsed from the termination of the sawtooth sweep. At this time the multivibrator is then permitted to recover, but since the circuit elements of the multivibrator have certain characteristic recovery times themselves, it frequently occurs that a trigger pulse will be impressed upon the multivibrator to trigger the latter before complete recovery has been achieved.

It is the primary object of the present invention to provide a method and hold-off circuit by means of which premature of otherwise undesirable trigger signals are prevented from triggering a multivibrator during the desired cycle of operation of said multivibrator by positive means not subject to the characteristics and to change in the characteristics of the circuit components of the multivibrator.

Another important object of this invention is to provide a hold-off circuit which is adjustable, whereby to provide for variable periods of delay before permitting a trigger signal to re-trigger the multivibrator.

A further important object of this invention is the provision of a hold-off circuit which is adjustable in such manner that the multivibrator may be reset by means of external triggers which may be controlled automatically or manually, as may be desired.

Still another important object of this invention is the provision in a multivibrator-triggered sweep circuit of a hold-off circuit which employs the output sweep waveform to control the stability of the multivibrator.

A further important object of this invention is the provision of a hold-off circuit which functions to control the stability of a multivibrator and to prevent for a predetermined time its being triggered, by maintaining the control element thereof at a level of potential which is incapable of effecting said triggering.

A still further object of the present invention is the provision of a hold-off circuit of the class described which is faithful in operation and is of simplified construction for economical manufacture.

These and other objects and advantages of the present invention will appear from the following detailed description taken in connection with the accompanying drawing, in which:

FIG. 1 is a schematic diagram of one form of hold-off circuit embodying the features of the present invention; and FIG. 2 is a graph showing the triggering waveform for the multivibrator and illustrating the operation of the hold-off circuit of FIG. 1.

Stated broadly, the method and hold-off circuit of this invention is associated with a multivibrator whose triggering is effected at a predetermined level of potential applied to a suitable control element, and involves the control of said potential in such manner as to delay the return of said control element to the triggering level for a predetermined time after reversion of the multivibrator.

Referring to FIG. 1 of the drawings, the multivibrator including the tubes V10 and V11 controls the operation of a sweep generator including the tubes V12, V13, V14 and V15, the output waveform of which is fed back to the multivibrator input to revert the multivibrator and is also delayed to function as a hold-off waveform. The source of trigger signals 100 is connected to terminal 101 which is connected through a differentiating network comprising capacitance 102 and resistance 103 to the grid 104 of multivibrator tube V10. The time constant of the differentiating network is short, in order to limit the size of trigger signals. Grid 104 is connected through resistance 103 to the common cathode connection of V17, V18 and V19 discussed hereinafter, said cathode connection being returned through resistance 105 to a negative potential, such as the −150 volts indicated.

The cathode 106 of tube V10 is conected to the cathode 107 of multivibrator tube V11, and these cathodes are returned to a negative potential through resistance 108. The plate 109 of tube V10 is connected through resistance 110 to a positive potential, such as the 100 volts indicated, and also through the parallel combination of capacitance 111 and resistance 112 to the grid 113 of tube V11. This grid is returned to the negative potential indicated through resistance 114. The screen grid 115 is connected to the positive potential indicated.

The plate 116 is connected to a positive potential through resistance 117, and it is also connected to ground through resistance 118. The cathodes of tubes V10 and V11 are sufficiently negative to enable the plate of tube V11 to drop below ground.

The plate 116 of tube V11 is also connected to the plates 119, 120 of the respective disconnect diodes V12 and V13. The cathode 121 of diode V12 is connected to the grid 122 of the sawtooth generator tube V14, said grid being returned to the negative potential indicated through resistance 123. The plate 124 of tube V14 is returned to the positive potential indicated through resistance 125.

The plate 124 of tube V14 is also connected through neon glow tube 126 and resistance 127 to the grid 128 of cathode follower tube V15, said grid being returned to the negative potential indicated through resistance 129. Capacitance 130 shunts the neon tube 126 and resistance 127 to preserve the high frequency gain to grid 128. The cathode 131 of tube V15 is connected to the cathode 132 of diode V13. The cathode 131 is also returned to the negative potential indicated through resistance 133. Timing capacitor 135 is connected between the cathode of cathode follower tube V15 and grid 122 of tube V14, as indicated.

The grid 136 of cathode follower tube V16 is connected to the tap on potentiometer resistance 133, while the cathode 137 is connected to the grid 138 of cathode follower tube V17. The cathode 137 is returned to the negative potential indicated through resistance 139, and to ground through capacitance 140. The cathode 141 of cathode follower V17 is connected to the cathode 142 of cathode follower tube V18, both cathodes being returned to the negative potential indicated through resistance 105. The cathode 145 of tube V19 is also connected to the cathode 142 of tube V18. The grid 146 of tube V19 is connected to the tap on potentiometer resistance 147 which is connected between the negative potential indicated and ground. The screen grid 148 is connected to the positive potential indicated and the plate 149 is connected through resistance 150 and switch 151 to the positive potential indicated.

The plate 149 of cathode follower tube V19 is also connected to the grid 143 of tube V18 through the parallel combination of resistance 152 and capacitance 153. In this manner tubes V18 and V19 become a bistable multivibrator, for purposes described in detail hereinafter.

The plate 154 of amplifier tube V20 is also connected to the grid 143 of cathode follower tube V18 through the compensated voltage divider comprising resistances 144 and 152 and capacitance 153. The screen grid 155 of tube V20 is connected to a positive potential, as indicated, and the cathode 156 is connected to the negative potential indicated through the parallel combination of resistance 157 and capacitance 158. The control grid 159 is connected to a negative potential of about −50 volts, as indicated, through resistance 160. This grid is also connected through capacitance 161 to terminal 162 to which is connected the source of external trigger signals 163. The plates of the tubes V19 and V20 normally operate at a negative potential with respect to ground, this being possible since the cathode of such tubes are connected to a source of negative potential through resistors, and a clamping diode V21 connected between the plates of such tubes and ground prevents the potential of such plates from going positive with respect to ground.

In the circuit shown in FIG. 1, and described in detail hereinbefore, the sweep multivibrator is of the direct coupled, bistable type. In the rest or quiescent state tube V10 is conducting. Tube V11 in the rest or quiescent state, is cut off. The biases and plate loads are chosen so that when tube V10 is conducting, the grid of tube V11 is held below cut-off, and when tube V11 is conducting, the cathode of tube V10 is held sufficiently positive to hold V10 cut off.

To return the multivibrator to the rest state, with tube V10 conducting, there is required at the grid of tube V10 a positive voltage which is high enough to cause plate current to flow. The positive voltage for this purpose is supplied from the sweep waveform, as explained more fully hereinafter. Potentiometer 147 functions to adjust the grid voltage of cathode follower tube V19 which, in turn, determines the voltage level of grid 104 during the rest state of tube V10. Various voltage levels may be provided, as explained in detail hereinafter.

The general operation of the circuit described hereinbefore is as follows: When a negative trigger signal 100 is applied to the grid 104, tube V10 is cut off and the resulting positive pulse 171 at plate 109 is coupled to the grid 113 of tube V11, thereby raising said grid above cut-off and causing plate current to flow. The resulting rise of cathode 107 also raises cathode 106, whereby tube V10 is removed still further from conduction. The negative step 172 from the plate 116 of tube V11 is applied to the plates of the disconnect diodes V12 and V13.

In the quiescent state between sweeps, the plates of diodes V12 and V13 rest, for example, at −3.5 volts. Also the cathodes 121 and 132 of the tubes V12 and V13 are slightly negative relative to the plates 119 and 120, respectively, so that the tubes V12 and V13 are conducting to discharge the capacitor 135 and to provide a direct current coupled feedback loop from the plate 124 of the tube V14 through the neon tube 126, the cathode follower V15 and the tubes V13 and V12 to the grid of the tube V14. The negative step to the diode plates lowers these plates below their cathodes, thus breaking the direct coupled feedback loop from plate 124 to grid 122 of tube V14. The capacitor 135 charges linearly and the resulting linear rise of the cathode 131 of cathode follower tube V15 is used as the positive-going portion 173 of a sweep sawtooth voltage which may be applied, for example, to the deflection plates of a cathode ray tube oscilloscope (not shown), by connection at terminal 170. It will be understood that the values of timing capacitor 135 and charging resistor 123 may be varied to cover a wide range of sawtooth slopes. Further, the length of the sweep may be adjusted by means of potentiometer resistance 133.

The cathode 131 of cathode follower tube V15 continues to rise linearly until a positive step from the sweep multivibrator tube V11 returns the disconnect diode plates 119, 120 to their quiescent state. Such a positive step occurs when the grid 104 of multivibrator tube V10 is brought positive enough to revert the multivibrator, and this is provided by the sawtooth sweep which is coupled back through cathode follower tubes V16 and V17 to the grid 104. The sweep drops rapidly to its quiescent value but capacitor 140 between the cathode 137 of tube V16 and ground functions to delay the application of the negative-going return portion of the sweep to the grid 104 of the tube so that such return portion is delayed to produce a delayed sweep return portion 174, whereby to retard the return of grid 104 to the quiescent level after the passage of the positive pulse. Thus, all trigger signals 100 are prevented from retriggering the multivibrator until all other capacitances in the circuit have had time to reach their quiescent voltage levels. The size of capacitor 140 may be varied so that more recovery time is permitted for slower sweeps and the least necessary recovery time is allowed for the faster sweeps.

The operation of the sweep multivibrator is controlled in both of its stable states by the potential at grid 104. Over a ecrtain region of its control the grid exhibits hysteresis, and the hysteresis region is defined with respect to waveform A, FIG. 2, by the lower limit 176 and the upper limit 177. Within this region, tube V10 is conducting when the region is approached from above the upper limit and tube V10 is cut off when the region is approached from below the lower limit. Thus, during the time of the positive-going portion 173 of the sweep tube V10 is cut off and during the delayed time of the negative-going return portion 174 applied to the grid of tube V10, such tube is conducting.

In order for the multivibrator to be controlled by the sawtooth waveform applied to grid 104, the magnitude of this waveform is selected, by proper values of circuit components, to be capable of extending across these hysteresis limits. This is indicated in FIG. 2 by waveform A, wherein the sawtooth waveform 173 is shown to originate below the lower hysteresis limit 176 at the cut-off bias level 178 of tube V17 and to terminate slightly above the upper limit 177. Under these conditions the sweep circuit is free running as explained below. The original negative-going return portion of this sweep waveform is shown in dotted line to return to this originating level. The delayed return 174 applied to the grid 104 of the tube V10 triggers the multivibrator, i.e., to render V11 conducting, when it crosses the lower hysteresis limit 176.

The delay between triggering of the multivibrator and the start of the grid rise is due to the time required for the sawtooth sweep to rise from the quiescent level 178 to the more positive voltage level 179 of the cathode 145 of tube V19.

Four modes of trigger hold-off operation are provided by the circuit shown in FIG. 1. Two of these modes obtain with switch 151 in the position identified as Sweep Normal. In this position, the plates of tube V19 and V20 are disconnected from the positive voltage source, and hence the plate of tube V19 drops to the potential of the −150 volt supply. Simultaneously, the grid 143 of tube V18 also drops to this negative potential and is therefore cut off permanently. Screen current furnishes the cathode current of tube V19, and therefore the stability control potentiometer 147 may be adjusted over its range to control the voltage applied to grid 104 of tube V10.

In one mode of operation, this control 147 is adjusted to set the grid voltage of tube V10 just below the lower hysteresis limit 176, as indicated in waveform A in FIG. 2. In this mode of operation the sweep circuit is free-running and requires no trigger signal 100, since the sawtooth sweep functions on its negative-going return automatically to revert the multivibrator and initiate another sweep. However, a trigger signal 100 arriving as the voltage of the grid 104 approaches the lower hysteresis limit 176 will still trigger the sweep.

A second mode of operation obtains with switch 151 in the position identified as Sweep Normal, when the stability control potentiometer 147 is adjusted to set the quiescent grid voltage of tube V10 just above the lower hysteresis limit 176. As indicated by waveform B in FIG. 2, the delayed negative-going portion 174 of the sawtooth sweep returns to a quiescent level above the lower hysteresis limit, and thus requires a trigger signal 100 to intercept this lower limit to trigger the sweep multivibrator. Thus, a subsequent sawtooth sweep is produced only upon triggering of the multivibrator by a negative trigger signal 100.

A third mode of operation occurs with switch 151 in the position identified as Sweep Delayed, and this mode is illustrated by waveform C in FIG. 2. Voltage is now supplied to the plates of tubes V19 and V20, with tube V19 functioning with tube V18 to form a bistable multivibrator. In the quiescent state, tube V18 conducts and holds the common cathode voltage so high that tube V19 is cut off. A positive differentiated trigger pulse 163 applied to grid 159 of tube V20 produces a negative pulse at plate 154 which is coupled to the grid 143 of tube V18. Thus, this tube is cut off and tube V19 is caused to conduct.

In the stable state wherein tube V18 is conducting said tube determines the voltage level of the common cathode circuit of cathodes 142 and 145, and this level 180 is high enough above the lower hysteresis limit 176 to hold off tube V10 from being returned to a conducting state, even in the presence of the negative trigger 100. Upon triggering of the hold-off multivibrator by an external trigger signal 163, with tube V19 conducting, said latter tube controls the common cathode voltage level, and this level 181 is lower than in the first state. Thus, by adjustment of potentiometer 147 the resulting grid voltage of tube V10 may be placed at or below the lower hysteresis limit 176 and the sweep multivibrator will be triggered upon triggering of the hold-off multivibrator by the external trigger signal 163. At the end of the positive-going sweep, the hold-off cathode follower tube V17 raises the common cathode level of cathodes 142, 145 momentarily, thereby reverting the hold-off multivibrator with tube V18 conducting and tube V19 cut off.

It is to be noted here that the potential of cathodes 142 and 145 is controlled by tube V17 until the sweep waveform has recovered completely and is maintained above the conduction level of tube V19 during that time. Accordingly, no external trigger signal 163 can revert the hold-off multivibrator prematurely.

A fourth mode of operation obtains with switch 151 in the position identified as Sweep Delayed and illustrated by waveform D in FIG. 2. By setting the cathode level by means of the stability potentiometer 147 slightly above the lower hysteresis limit 176, the sweep will not be triggered while tube V19 is conducting, but the grid 104 of tube V10 will be placed close enough to triggering that a negative trigger pulse 100 from a trigger source will trigger the sweep multivibrator and initiate a sweep.

Thus, in the first mode of operation the delayed return portion 173 of the sawtooth sweep which is fed back to grid 104 operates recurrently to trigger the sweep multivibrator and any trigger signal 100 arriving when such portion is approaching the lower hysteresis limit 176 will still trigger the sweep multivibrator. In the second mode of operation the sweep multivibrator is triggered by a negative trigger signal 100, after the circuit components have returned to their quiescent levels, as afforded by the delayed return portion 174 of the sawtooth sweep fed back to grid 104. In the third mode of operation the positive trigger pulse 163 actually controls the triggering of the sweep multivibrator. In the fourth mode the positive trigger pulse 163 functions to revert the hold-off multivibrator to cause conduction of tube V19. The voltage on grid 104 is set close enough to triggering that the next negative trigger pulse 100 will trigger a sweep multivibrator. The fourth mode of operation, when used in connection with a cathode ray tube oscilloscope, permits the display of delayed signals without jitter, even if the signal itself jitters.

In the circuit illustrated in the drawings and described hereinbefore, triggering of the sweep multivibrator is effected at a predetermined level of potential applied to a control element and the return of this control element to said triggering level after reversion of the multivibrator is controlled by a delayed hold-off signal which is initiated by the signal produced by reversion of the multivibrator. The hold-off signal is either mixed with a trigger signal which will return the control element to triggering level, or the voltage level of the hold-off signal at its termination is adjusted to return the control element to the triggering potential of the sweep multivibrator. Thus, the hold-off circuit functions to control the stability of the multivibrator, to prevent improper operation as well as premature triggering.

It will be apparent to those skilled in the art that many modifications and changes may be made in the illustrated arrangements described in detail hereinbefore without departing from the scope and spirit of this invention. For example, transistors may be substituted for the vacuum tubes, if desired, and they are intended to be included in the term electron discharge device as employed in the appended claims.

Also the hold-off circuits and method of the present invention are applicable to multivibrators of various types. In any case it is required only that triggering of the multivibrator be controlled by a predetermined level of potential applied to a suitable control element of the multivibrator, such as the cathode, control grid or suppressor grid of one of the multivibrator vacuum tubes. Further, it will be apparent that when differentiated trigger signals are employed to trigger the multivibrator, they need not be applied to the same element that carries the control potential, it being required only that the trigger signals be applied to an element which is so associated with the control element as to effect mixing of the trigger signals and the hold-off signal. Accordingly, it is to be understood that the foregoing description is merely illustrative and is not to be considered in a limiting sense.

Having now described my invention and the manner in which the same may be used, what I claim as new and desire to secure by Letters Patent is:

1. A voltage generator circuit comprising:
multivibrator means having first and second stable states for providing a first control voltage when in said first state and a second control voltage when in said second state,
voltage generator means responsive to said control voltages for producing an output voltage which varies from an initial value toward a second value when the multivibrator means changes from said first state to said second state and which rapidly returns to said initial value when the multivibrator means changes back to said first state,
feedback circuit means for feeding said output voltage back to the multivibrator means to cause the multivibrator means to change back to said first state when said output voltage reaches said second value,
and time delay means in said feedback circuit means for preventing the multivibrator means from again changing from said first state to said second state for a time delay after said output voltage has returned to said initial value.

2. A voltage generator circuit comprising:
multivibrator means having first and second stable states for providing a first control voltage when in said first state and a second control voltage when in said second state,
voltage generator means responsive to said control voltages for producing an output voltage which varies linearly from an initial value toward a second value when the multivibrator means changes from said first state to said second state and which rapidly returns to said initial value when the multivibrator means changes back to said first state,
trigger signal input means for delivering trigger signals to said multivibrator to cause said multivibrator to change from said first state to said second state,
feedback circuit means for feeding said output voltage back to the multivibrator means to cause the multivibrator means to change back to said first state when said output voltage reaches said second value,
and time delay means in said feedback circuit means for preventing the multivibrator means from again changing from said first state to said second state for a time delay after said output voltage has returned to said initial value.

3. A voltage generator circuit comprising:
multivibrator means having first and second stable states for providing a first control voltage when said multivibrator means is in said first state and a second control voltage when said multivibrator means is in said second state,
voltage generator means responsive to said control voltages for producing an output voltage which varies linearly from an initial value toward a second value when the multivibrator means changes from said first state to said second state and which rapidly returns to said initial value when said multivibrator means changes back to said first state,
voltage mixing means associated wtih said multivibrator means,
trigger signal input means for delivering trigger voltages to said mixing means to trigger said multivibrator means to cause it to change from said first state to said second state,
feedback circuit means for delivering said output voltage to said mixing means in opposition to said trigger signals to cause said multivibrator means to change back to said first state when said output voltage reaches said second value,
and time delay means in said feedback circuit means to prevent said trigger signals from again triggering said multivibrator means for a time delay after said output voltage reaches said initial value.

4. A voltage generator circuit comprising:
multivibrator means having first and second stable states for providing a first control voltage when said multivibrator means is in said first state and a second control voltage when said multivibrator means is in said second state,
voltage generator means responsive to said control voltages for producing an output voltage which varies linearly from an initial value toward a second value when the multivibrator means changes from said first state to said second state and which rapidly returns to said initial value when said multivibrator means changes back to said first state,
voltage mixing means associated with said multivibrator means,
trigger signal input means for delivering trigger voltages to said mixing means to trigger said multivibrator means to cause it to change from said first state to said second state,
direct current feedback circuit means for delivering said output voltage to said mixing means in opposition to said trigger signals to cause said multivibrator means to change back to said first state when said output voltage reaches said second value,
time delay means in said feedback circuit means to prevent said trigger signals from again triggering said multivibrator means for a time delay after said output voltage reaches said initial value,
and adjustable voltage means for delivering a direct current adjustable voltage to said mixing means to set the voltage of the trigger signal required to trigger said multivibrator means including an adjustable voltage which will cause triggering of said multivibrator means after said time delay upon return of said output voltage to said initial value.

5. A voltage generator circuit comprising:
multivibrator means having first and second stable states for providing a first control voltage when said multivibrator means is in said first state and a second control voltage when said multivibrator means is in said second state,
voltage generator means responsive to said control voltages for producing an output voltage which varies linearly from an initial value toward a second value when the multivibrator means changes from said first state to said second state and which rapidly returns to said initial value when said multivibrator means changes back to said first state,
voltage mixing means associated with said multivibrator means,
trigger signal input means for delivering trigger voltages to said mixing means to trigger said multivibrator means to cause it to change from said first state to said second state,
direct current feedback circuit means for delivering said output voltage to said mixing means in opposition to said trigger signals to cause said multivibrator means to change back to said first state when said output voltage reaches said second value,
and time delay means in said feedback circuit means to prevent said trigger signals from again triggering said multivibrator means for a time delay after said output voltage reaches said initial value,
second multivibrator means having two steady states and supplying a control potential to said mixing means preventing triggering of the first mentioned multivibrator means when said second multivibrator is in one of its states and enabling said triggering when said second multivibrator means is in the other of the states,
means for supplying trigger signals to said second multivibrator means for causing said second multivibrator means to change from said one state to said other state,
and connection means between said feedback circuit and said second multivibrator means to cause said second multivibrator means to change back to its one state when said output voltage reaches said second value.

6. A voltage generator circuit comprising:
multivibrator means having first and second stable states for providing a first control voltage when said multivibrator means is in said first state and a second control voltage when said multivibrator means is in said second state,
voltage generator means responsive to said control voltages for producing an output voltage which varies linearly from an initial value toward a second value when the multivibrator means changes from said first state to said second state and which rapidly returns to said initial value when said multivibrator means changes back to said first state,
voltage mixing means associated with said multivibrator means,
trigger signal input means for delivering trigger voltages to said mixing means to trigger said multivibrator means to cause it to change from said first state to said second state,
direct current feedback circuit means for delivering said output voltage to said mixing means in opposition to said trigger signals to cause said multivibrator means to change back to said first state when said output voltage reaches said second value,
and time delay means in said feedback circuit means to prevent said trigger signals from again triggering said multivibrator means for a time delay after said output voltage reaches said initial value,
second multivibrator means having two steady states and supplying a control potential to said mixing means preventing triggering of the first mentioned multivibrator means when said second multivibrator is in one of its states and enabling said triggering when said second multivibrator means is in the other of the states,
means for supplying trigger signals to said second multivibrator means for causing said second multivibrator means to change from said one state to said other state,
connection means between said feedback circuit and said second multivibrator means to cause said second multivibrator means to change back to its one state when said output voltages reaches said second value,
and adjustable voltage means associated with said second multivibrator means for delivering a direct current adjustable voltage to said mixing means to set the voltage of the trigger signal required to trigger said first mentioned multivibrator means including an adjustable voltage which will cause triggering of said first mentioned multivibrator means after said time delay upon return of said output voltage to said initial value.

7. A voltage generator circuit comprising:
first multivibrator means having two stable states and having an input portion and also having an output portion for producing a gating voltage,
voltage generator means responsive to said gating voltage from said output portion for producing a varying voltage which gradually changes from a first predetermined voltage when said multivibrator means changes from one of its states to its other state and for causing a rapid return of said varying voltage to said first predetermined voltage when said multivibrator means changes back to said one state,
first input means for delivering input trigger pulses to the input portion of said multivibrator means to cause said multivibrator means to change from said one state to said other state,
circuit means including a cathode follower tube having a cathode load resistance for feeding back the resulting gradually varying voltage produced by said voltage generator means to said input portion of said multivibrator means for causing said multivibrator means to change from said other state back to said one state when said gradually varying voltage reaches a second predetermined voltage,
said multivibrator means having a recovery period after changing back to said one state and said voltage generator means having a recovery period when said varying voltage returns to said first predetermined voltage,
and time delay means in said circuit means including a capacitor also providing a cathode load for said tube for preventing said trigger pulses from causing said multivibrator means again changing to said other state until after said recovery periods,
second multivibrator means having two stable states and being connected to said circuit means so as to be changed from a second state to a first state after said recovery periods for also preventing said trigger pulses from causing said first multivibrator from again changing to said other state,
second input means for delivering trigger pulses to said second multivibrator for causing said second multivibrator to thereafter change back to said second state to enable trigger pulses to cause said first multivibrator means to change to said other state.

References Cited in the file of this patent

UNITED STATES PATENTS

| | | |
|---|---|---|
| 2,557,770 | Scoles | June 19, 1951 |
| 2,562,295 | Chance | July 31, 1951 |
| 2,577,475 | Miller | Dec. 4, 1951 |
| 2,644,887 | Wolfe | July 7, 1953 |
| 2,661,421 | Talamini | Dec. 1, 1953 |
| 2,688,079 | Wachtell | Aug. 31, 1954 |
| 2,748,272 | Schrock | May 29, 1956 |
| 2,764,681 | Howell | Sept. 25, 1956 |
| 2,769,905 | Ropiequet | Nov. 6, 1956 |

OTHER REFERENCES

Millman and Taub: McGraw-Hill, pages 164–172.